(12) United States Patent
Cierniak et al.

(10) Patent No.: US 8,738,654 B2
(45) Date of Patent: May 27, 2014

(54) OBJECTIVE AND SUBJECTIVE RANKING OF COMMENTS

(75) Inventors: Michal Cierniak, Palo Alto, CA (US); Donn Denman, Los Gatos, CA (US); Tony Hsieh, Cupertino, CA (US); Yuri Dolgov, St. Petersburg (RU); Andrey Adaikin, St. Petersburg (RU); Derek Prothro, San Mateo, CA (US); Marc Pawliger, San Jose, CA (US); Ario Jafarzadeh, San Francisco, CA (US); Vladislav Kaznacheev, St. Petersburg (RU)

(73) Assignee: Google Inc., Mountain View, CA (US)

( * ) Notice: Subject to any disclaimer, the term of this patent is extended or adjusted under 35 U.S.C. 154(b) by 63 days.

(21) Appl. No.: 13/615,753

(22) Filed: Sep. 14, 2012

(65) Prior Publication Data
US 2013/0006978 A1    Jan. 3, 2013

Related U.S. Application Data

(63) Continuation of application No. 13/059,215, filed as application No. PCT/RU2009/000397 on Aug. 12, 2009, now Pat. No. 8,321,463.

(51) Int. Cl.
*G06F 17/30*    (2006.01)

(52) U.S. Cl.
CPC ..................... *G06F 17/30* (2013.01)
USPC ............ 707/791; 707/802; 707/822; 707/828

(58) Field of Classification Search
CPC ....................................................... G06F 17/30
USPC ................................................. 707/600–899
See application file for complete search history.

(56) References Cited

U.S. PATENT DOCUMENTS

| | | | |
|---|---|---|---|
| 8,150,831 B2 | 4/2012 | Zhang et al. | |
| 8,321,463 B2 | 11/2012 | Cierniak et al. | |
| 2009/0119173 A1* | 5/2009 | Parsons et al. | 705/14 |

FOREIGN PATENT DOCUMENTS

WO    WO 2009/073664    6/2009

OTHER PUBLICATIONS

Notification of transmittal of the International Search Report and the Written Opinion of the International Searching Authority, or the Declaration corresponding to PCT/RU2009/000397, mailed May 3, 2010, 12 pages.

* cited by examiner

*Primary Examiner* — Isaac M Woo
(74) *Attorney, Agent, or Firm* — Harrity & Harrity, LLP

(57) ABSTRACT

A system may receive a request for comments associated with a particular document, identify a comment associated with the particular document, generate an objective score for the comment that is independent of a user associated with the request, identify the user associated with the request, generate a subjective score for the comment based on parameters associated with the identified user, generate a combined score for the comment by combining the objective score and the subjective score, and provide the comment, ranked based on the combined score, to the user for presentation with the particular document.

20 Claims, 13 Drawing Sheets

US 8,738,654 B2

OBJECTIVE AND SUBJECTIVE RANKING OF COMMENTS

RELATED APPLICATION

This application is a continuation of U.S. application Ser. No. 13/059,215, filed Feb. 15, 2011, the disclosure of which is incorporated herein by reference.

BACKGROUND

Many techniques are available to users today to find information on the world wide web ("web"). For example, users often use web browsers and/or search engines to find information of interest.

A user may enter a search query into a search box of a browser and the browser may submit the search query to a search engine. The search engine may identify documents that match the search query, rank the documents based on various factors, and return a ranked list of document to the user. The user may select a document from the list and request the document. A browser may retrieve the requested document and display the document to the user in a browser window.

However, the amount of available information that is available to users on the web can be overwhelming.

SUMMARY

According to one implementation, a method, performed by one or more devices, may include receiving a request for comments associated with a particular document; identifying, at a processor associated with the one or more server devices, a comment associated with the particular document; generating, using a processor associated with the one or more server devices, an objective score for the comment, where the objective score is independent of a user associated with the request; identifying, using a processor associated with the one or more server devices, the user associated with the request; generating, using a processor associated with the one or more server devices, a subjective score for the comment based on the identified user; generating, using a processor associated with the one or more server devices, a combined score for the comment by combining the objective score and the subjective score; and providing the comment, ranked based on the combined score, to a client device associated with the user for presentation with the particular document.

According to another implementation, one or more devices may include a comments database that stores comments associated with documents; a searching component to receive a request for comments associated with a particular document and to identify the comments by searching the comments database, where the request for comments is associated with a particular user; a ranking component to rank the identified comments, comprising an objective ranking component to generate objective scores for comments, where the objective scores are independent of the particular user, and a subjective ranking component to generate subjective scores for comments, where the subjective scores depend on the particular user; and an interface to provide, to a client device associated with the user, the ranked comments for presentation in connection with the particular document.

According to yet another implementation, a computer-readable medium containing instructions executable by one or more devices may include one or more instructions to identify comments associated with a particular document; one or more instructions to generate objective scores for the comments, where the objective scores are independent of users; one or more instructions to identify a user accessing the particular document; one or more instructions to generate subjective scores for the comments based on the identified user and based on authors of the comments; one or more instructions to combine the objective scores and the subjective scores; and one or more instruction to provide the comments, ranked based on the combined scores, to the user for presentation in connection with the particular document.

According to yet another implementation, a system may include one or more devices, comprising means for receiving a request for comments associated with a particular document; means for identifying a comment associated with the particular document; means for generating an objective score for the comment, where the objective score is independent of a user associated with the request; means for identifying the user associated with the request; means for generating a subjective rank score for the comment based on factors associated with the identified user; means for generating a final rank score for the comment by combining the objective rank score and the subjective rank score; and means for providing the comment, ranked based on the combined score, to the user for presentation in connection with the particular document.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

Figure 1:
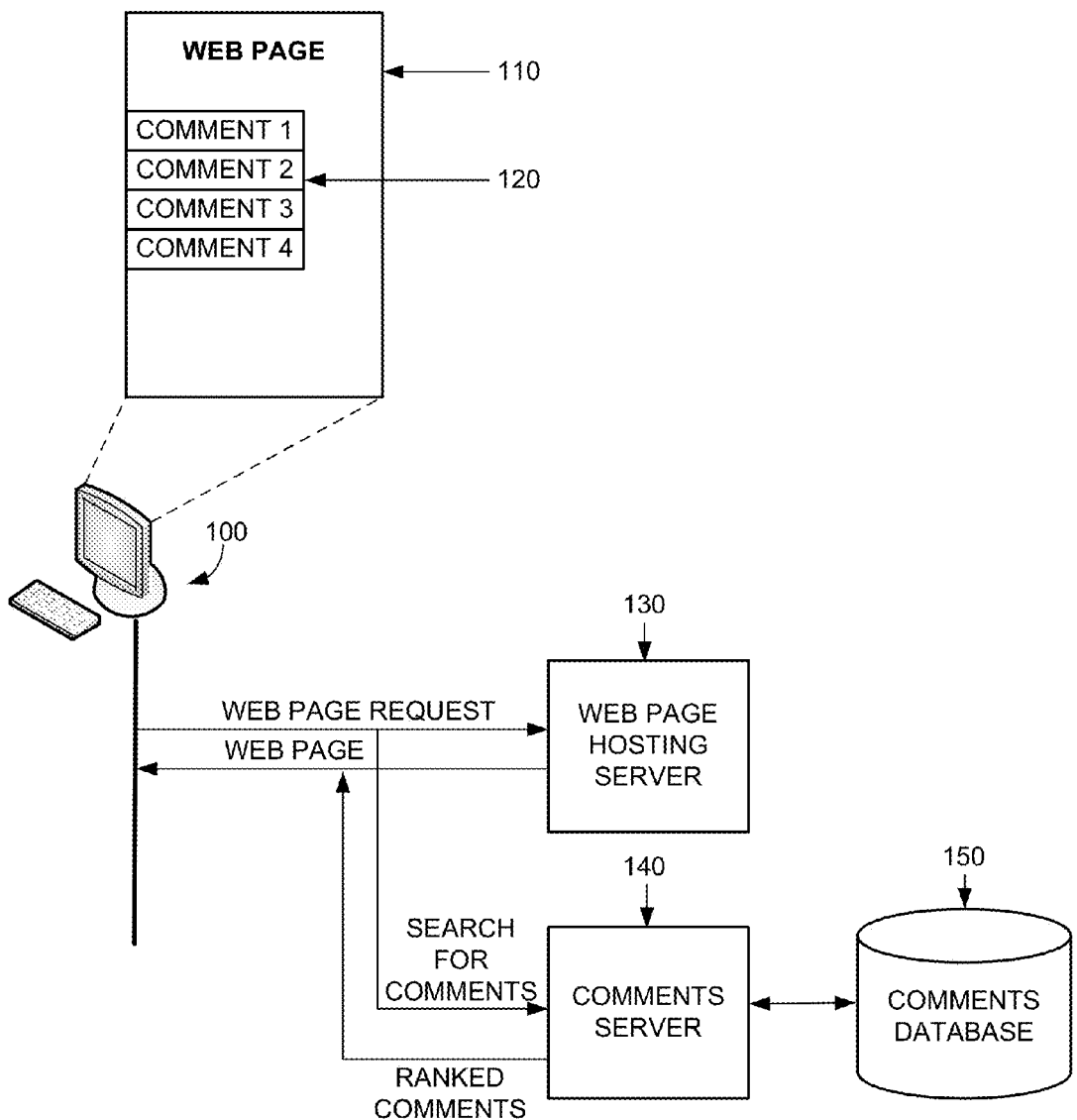
FIG. 1 is a diagram illustrating an overview of an exemplary implementation described herein.

The following detailed description refers to the accompanying drawings. The same reference numbers in different drawings may identify the same or similar elements.

Overview

For some documents, users might like to see other documents that comment on the contents of these documents.

These "other" documents might take various forms and will be referred to herein as "comments." A comment, also known as an annotation, may include any document (or a portion of a document) that provides an opinion of, or otherwise remarks upon, the contents of another document. One example of a comment may include a blog post. Another example of a comment may include a web page or a news article that remarks upon an item (e.g., a product, a service, a company, a web site, an image, a person, a group of persons, a geographic location, or something else that can be remarked upon). Another example of a comment may include a comment about another comment.

A simple definition of a comment might be to assume that any document that links to another document is a comment that remarks upon that document. This approach is too simple to be useful because many documents are linked to by documents that are unrelated to the subject matter of the documents or were not created specifically to remark on the documents.

Comments may be created (or modified) by users using a browser add-on installed on a browser. In one implementation, the browser add-on may include a toolbar that may be displayed in a browser window and provide one or more buttons, one or more search boxes, and/or one or more indicators (e.g. icons, message displays, etc.). The toolbar may include a button for creating (or modifying) comments about the document that is being displayed by the browser. In another implementation, the browser add-on may not include a toolbar. For example, the browser add-on may not have any elements associated with it that are visible to a user of the browser. A comment may be identified as a comment by being stored in a particular database. Alternatively, or additionally, a comment may be identified as a comment by being labeled as a comment and being associated with a particular document, and may be available in presentation with the particular document. In other words, a user may be able to view comments in connection with the document with which the comments are associated with.

When a user accesses a document (i.e. visits a web page), there may be many comments about the document that exist. For example, there may be hundreds or thousands comments for a particular document. It may be very beneficial to present, to the user, comments that are most likely to be useful to the user. Otherwise, the user may be overwhelmed with content. Described herein are systems and methods for ranking comments made about a document and providing the ranked comments for presentation with the document. As described herein, the ranking of the comments may be customized to a particular user.

A "document," as the term is used herein, is to be broadly interpreted to include any machine-readable and machine-storable work product. A document may include, for example, an e-mail, a web site, a file, a combination of files, one or more files with embedded links to other files, a news group posting, a news article, a blog, a business listing, an electronic version of printed text, a web advertisement, etc. In the context of the Internet, a common document is a web page. Documents often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

FIG. 1 is a diagram illustrating an overview of an exemplary implementation described herein. As shown in FIG. 1, assume that a user requests a particular document using a browser application. In response to the selection, the browser may send a request for the web page to web page hosting server 130. In addition to sending a request for the web page to web hosting server 130, the browser may send a request for comments about the web page to comments server 140. The request for comments may be activated based on a toolbar installed with the browser. The toolbar may be referred to herein as a comments toolbar.

In one implementation, the request for comments may be activated any time the browser sends a request for a web page. In another implementation, the request for comments may be activated only in response to a specific request from the user. For example, the request for comments may be activated in response to a user clicking on a "comments" button on the comments toolbar.

In response to receiving the request for comments about the web page, comments server 140 may search comments database 150 for comments about the requested web page. Comments server 140 may identify a list of comments that were submitted about the requested web page. The list of identified comments may be ranked by comments server 140 and sent to the browser running on client 100. The comments may be ranked based on objective parameters that are independent of the user, and based on subjective parameters that depend on the user. The browser may display, or otherwise present, requested web page 110, along with ranked comments 120.

Exemplary Environment

Figure 2:
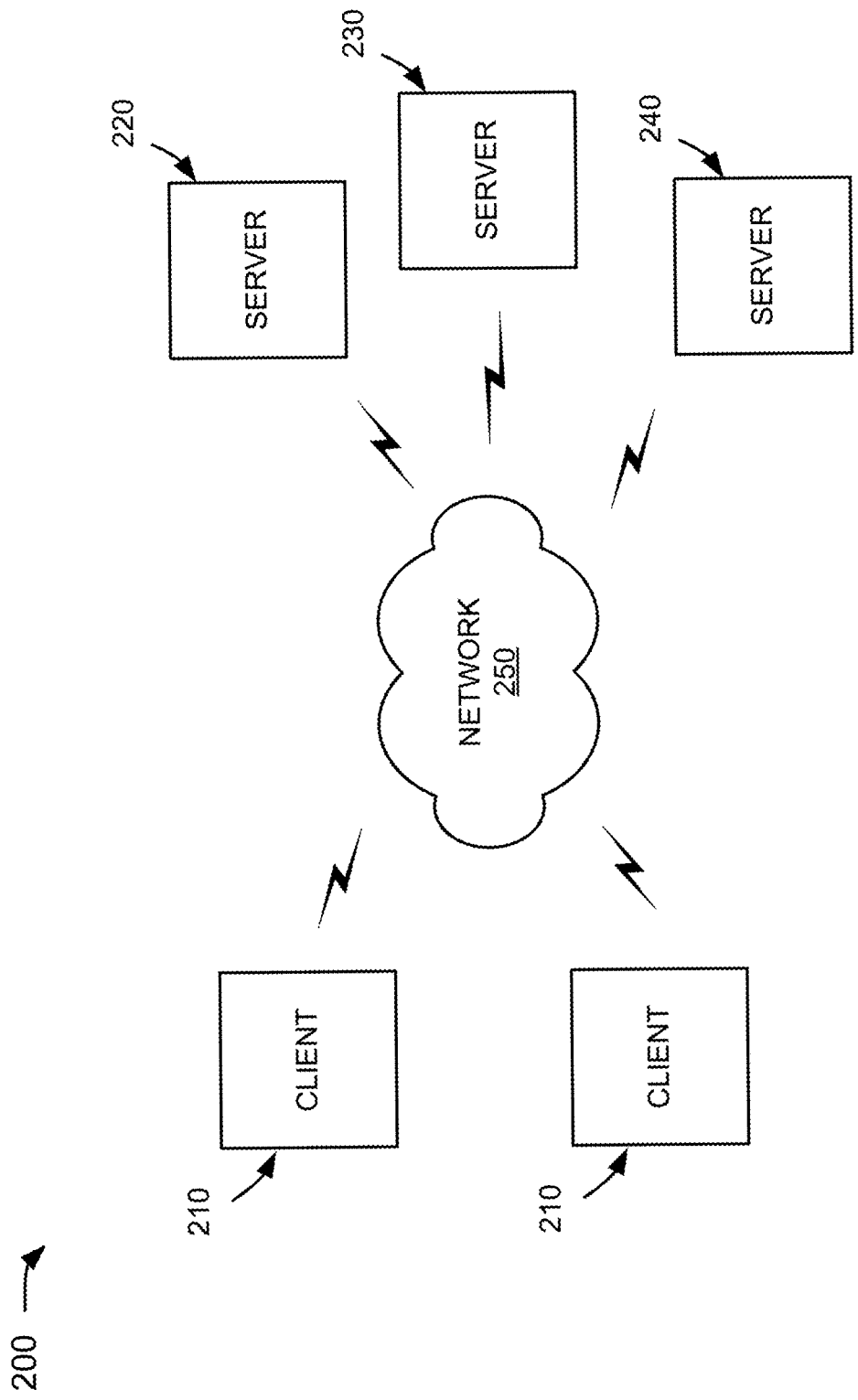
FIG. 2 is a diagram of an exemplary environment in which systems and methods described herein may be implemented.

FIG. 2 is a diagram of an exemplary environment 200 in which systems and methods described herein may be implemented. Environment 200 may include multiple clients 210 connected to multiple servers 220-240 via a network 250. Two clients 210 and three servers 220-240 have been illustrated as connected to network 250 for simplicity. In practice, there may be more or fewer clients and servers. Also, in some instances, a client may perform a function of a server and a server may perform a function of a client.

Clients 210 may include client entities. An entity may be defined as a device, such as a personal computer, a wireless telephone, a personal digital assistant (PDA), a lap top, or another type of computation or communication device, a thread or process running on one of these devices, and/or an object executed by one of these devices. In one implementation, a client 210 may include a browser that permits documents to be searched and/or accessed. Client 210 may also include software, such as a plug-in, an applet, a dynamic link library (DLL), or another executable object or process, that may operate in conjunction with (or be integrated into) the browser to obtain and display comments. Client 210 may obtain the software from server 220 or from a third party, such as a third party server, disk, tape, network, CD-ROM, etc. Alternatively, the software may be pre-installed on client 210. For the description to follow, the software will be described as integrated into the browser.

Servers 220-240 may include server entities that gather, process, search, and/or maintain documents in a manner described herein. In one implementation, server 220 may gather, process, and/or maintain comments that are associated with particular documents. Servers 230 and 240 may store or maintain comments and/or documents.

While servers 220-240 are shown as separate entities, it may be possible for one or more of servers 220-240 to perform one or more of the functions of another one or more of servers 220-240. For example, it may be possible that two or more of servers 220-240 are implemented as a single server.

It may also be possible for a single one of servers 220-240 to be implemented as two or more separate (and possibly distributed) devices.

Network 250 may include any type of network, such as a local area network (LAN), a wide area network (WAN), a telephone network (e.g., the Public Switched Telephone Network (PSTN) or a cellular network), an intranet, the Internet, or a combination of networks. Clients 210 and servers 220-240 may connect to network 250 via wired and/or wireless connections.

Exemplary Client/Server Architecture

Figure 3:
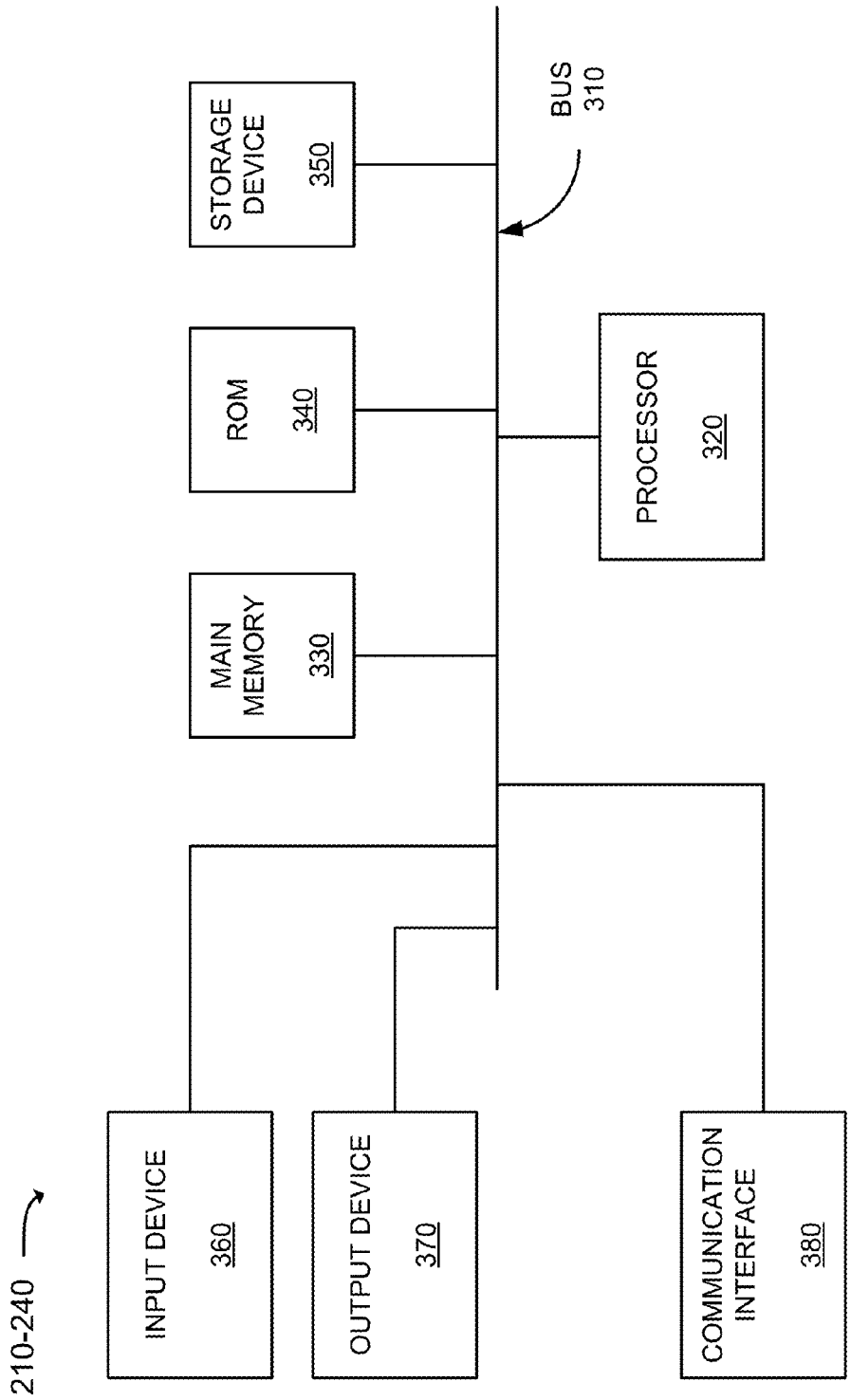
FIG. 3 is a diagram of exemplary components of a client or a server of FIG. 2.

FIG. 3 is a diagram of exemplary components of a client or server entity (hereinafter called "client/server entity"), which may correspond to one or more of clients 210 and/or servers 220-240. The client/server entity may include a bus 310, a processor 320, a main memory 330, a read only memory (ROM) 340, a storage device 350, an input device 360, an output device 370, and a communication interface 380. In another implementation, client/server entity may include additional, fewer, different, or differently arranged components than are illustrated in FIG. 3.

Bus 310 may include a path that permits communication among the components of the client/server entity. Processor 320 may include a processor, a microprocessor, or processing logic (e.g., an application specific integrated circuit (ASIC) or a field programmable gate array (FPGA)) that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive, or a removable form of memory, such as a flash memory.

Input device 360 may include a mechanism that permits an operator to input information to the client/server entity, such as a keyboard, a mouse, a button, a pen, a touch screen, voice recognition and/or biometric mechanisms, etc. Output device 370 may include a mechanism that outputs information to the operator, including a display, a light emitting diode (LED), a speaker, etc. Communication interface 380 may include any transceiver-like mechanism that enables the client/server entity to communicate with other devices and/or systems. For example, communication interface 380 may include mechanisms for communicating with another device or system via a network, such as network 250. For example, communication interface 380 may include a modem, a network card, or a wireless card.

As will be described in detail below, the client/server entity may perform certain operations relating to the processing of comments. The client/server entity may perform these operations in response to processor 320 executing software instructions contained in a computer-readable medium, such as memory 330. A computer-readable medium may be defined as one or more logical or physical memory devices. A logical memory device may include a space within a single physical memory device or spread across multiple physical memory devices.

Figure 4:
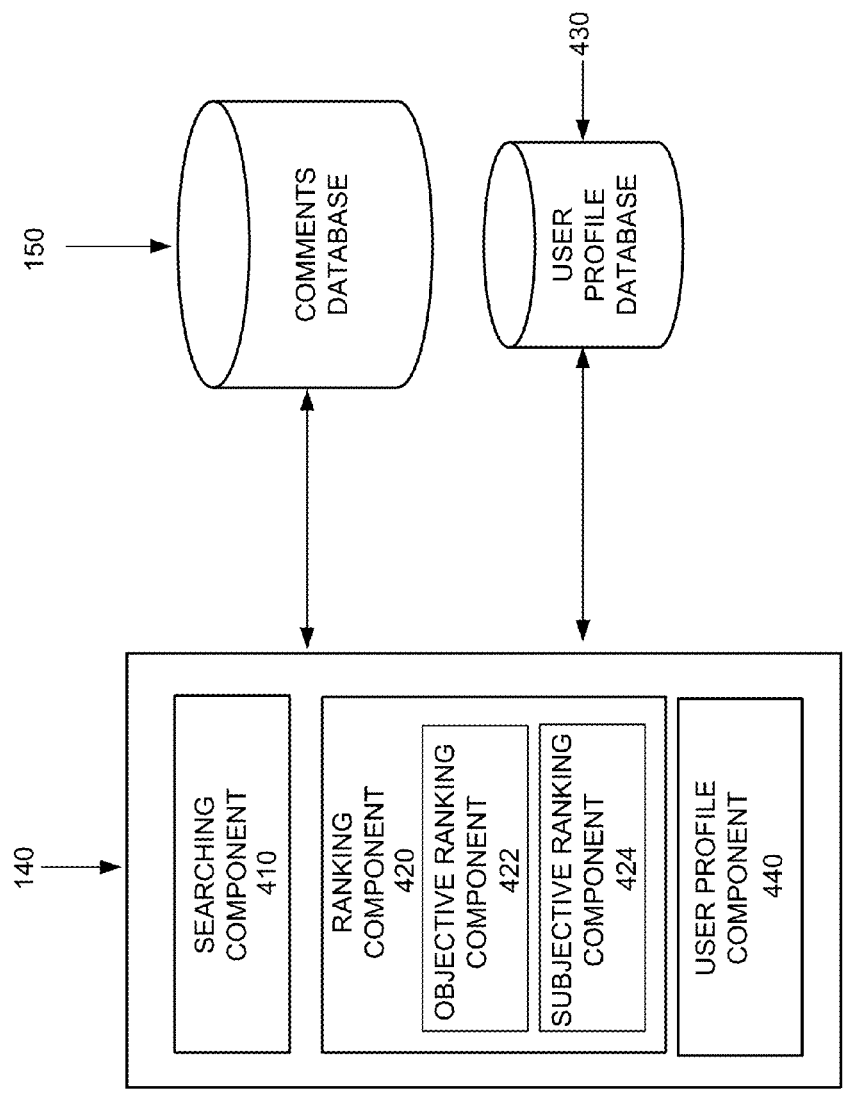
FIG. 4 is a diagram of exemplary components of a comments server of FIG. 1.

The software instructions may be read into memory 330 from another computer-readable medium, such as storage device 350, or from another device via communication interface 380. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software FIG. 4 is a diagram of exemplary components of comments server 140. Comments server 140 may be coupled to comments database 150 and user profile database 430. Comments server 140 may include searching component 410, ranking component 420, and user profile component 440. Comments server 140 may include multiple servers, and searching component 410, ranking component 420, and user profile component 440 may be implemented in the same server or may each be implemented in different servers.

Comments database 150 may store records of comments. An exemplary comment record is described below with reference to FIG. 5. User profile database 430 may store records of user profiles. An exemplary user profile record is described below with reference to FIG. 6.

Comments server 140 may include searching component 410. Searching component 410 may receive a request for comments for a particular document. For example, a user may click on a button labeled "comments" in a comments toolbar of a browser, while viewing the particular document and the toolbar may send the request to searching component 410. Searching component 410 may search comments database 150 to identify comments made about the particular document. For example, searching component 410 may identify records in comments database 150 that include an address (e.g., a uniform resource locator (URL)) associated with the particular document.

Ranking component 420 may receive identified comments from searching component 410, rank the identified comments, and output the ranked comments. Ranking component 420 may include objective ranking component 422 and subjective ranking component 424. Objective ranking component 422 may score the identified comments based on objective parameters. Objective parameters may include parameters with values that are independent of a particular user. Exemplary objective parameters and an exemplary objective score function based on objective parameters is described below with reference to FIG. 9. Objective ranking component 424 may generate an objective score for a comment identified by searching component 410. Subjective ranking component 424 may score the identified comments based on subjective parameters. Subjective parameters may include parameters with values that depend on a particular user. Exemplary subjective parameters and an exemplary subjective score function based on subjective parameters is described below with reference to FIG. 10. Subjective ranking component 424 may generate a subjective score for a comment identified by searching component 410.

Ranking component 420 may generate a combined score for a comment identified by searching component 410 based on combining an objective score generated by objective ranking component 422 and a subjective score generated by subjective ranking component 424. An exemplary combined ranking function is described below with reference to FIG. 11.

User profile component 440 may create and maintain user profiles stored in user profile database 430. In one implementation, user profile component 440 may provide an option, to a particular user, to create a user profile when the particular user performs a certain action, such as accessing a particular web site or installing a toolbar that allows the user to create (or modify) and view comments. When creating the user profile, user profile component 440 may present, to a user, an option to enter information for fields stored within the user profile. In another implementation, user profile component 440 may gather information for at least some of the fields of a user's profile without explicitly presenting an option to the user to enter information. When a user profile is generated without presenting an option to the user to enter information, the information may be obtained based on user activity. For example, a user may have preferred authors, whose content the user likes to read. In one implementation, preferred authors may be identified based on blogs that the user visits regularly. Information about what blogs the user visits may be collected by a comments toolbar installed in the browser that the user is using. This information may be collected with the express permission of the user.

Exemplary Data Structures

Figure 5:
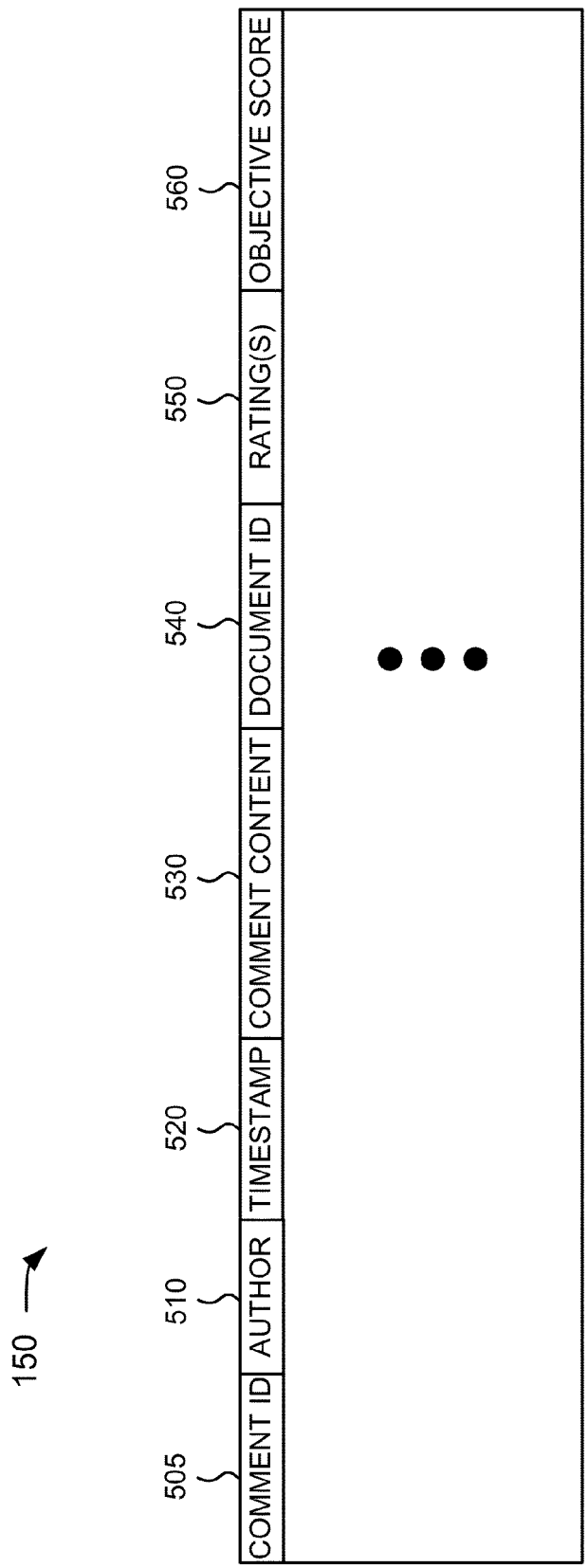
FIG. 5 is a diagram of exemplary fields that may be provided within the comments database of FIG. 4.

FIG. 5 is a diagram of exemplary fields that may be provided within comments database 150. As shown in FIG. 5, a record in comments database 150 may include comment identification field 505, author field 510, timestamp field 520, comment content field 530, document identifier field 540, rating(s) field 550, and objective score field 560. In other implementations, comments database 150 may include more or fewer fields.

Comment identification field 505 may store a unique identifier string that identifies the comment. Author field 510 may store information regarding the author of the comment. An author of a comment may be the user that created (or modified) the comment. An author may not be a single user, but may also refer to a group of users, such as an organization. Author field 510 may store the name of the author (e.g., actual name or online name), an image of the author, a graphic associated with the author, the name of a geographic location of the author, or other information regarding the author. Timestamp field 520 may store the date and/or time that the comment was created (or modified). The date/time for timestamp field 520 may be generated by client 210 at which the comment was created (or modified) or may be generated by server 220 based on a date/time at which the comment is received from client 210.

Comment content field 530 may store the content of the comment. For example, the content of a comment may include text, video, image, and/or audio data. In one implementation, comment content field 530 may store the actual content of the comment. In another implementation, comment content field 530 may store a pointer to a storage location where the actual content of the comment is stored.

Document identifier field 540 may store information identifying a particular document with which the comment is related. For example, document identifier field may store an address (e.g., a URL) of the document for which the comment was originally created. Rating(s) field 570 may store a rating for the comment. A rating may be based on user feedback regarding the comment. For example, users may be permitted to rate a comment (favorably or unfavorably). The rating may be an average of ratings submitted by users when rating the comments. For example, users may be given an option to rate a comment on a multiple point scale, such as a five point scale. In one implementation, ratings submitted by different users are given equal weight in computing an average rating. In another implementation, users may be rated by other users, and users that are rated highly by other users may be given more weight when rating a comment. For example, a particular user's comments may consistently be highly rated by other users. When that particular user rates another comment, the particular user's rating may be given more weight in computing the average rating of a comment.

Objective score field 560 may store an objective score for the comment. The objective score may be used to rank the comment among other comments and may be computed based on objective parameters that are independent of a particular user. Objective parameters used to compute the objective score may include at least one of a measure of relevance of the comment to the document, linking structure of the comment, reputation of the author of the comment, user ratings of the comment, a time stamp of the comment, a length of the comment, and a spelling and grammar score for the comment. In another implementation, records in comments database 150 may not include objective score field 560.

Comments database may store other information associated with comments. For example, comments database 150 may store an indication of a language in which the content of a particular comment is written. As another example, comments database may store information about a location associated with a particular comment.

Figure 6:
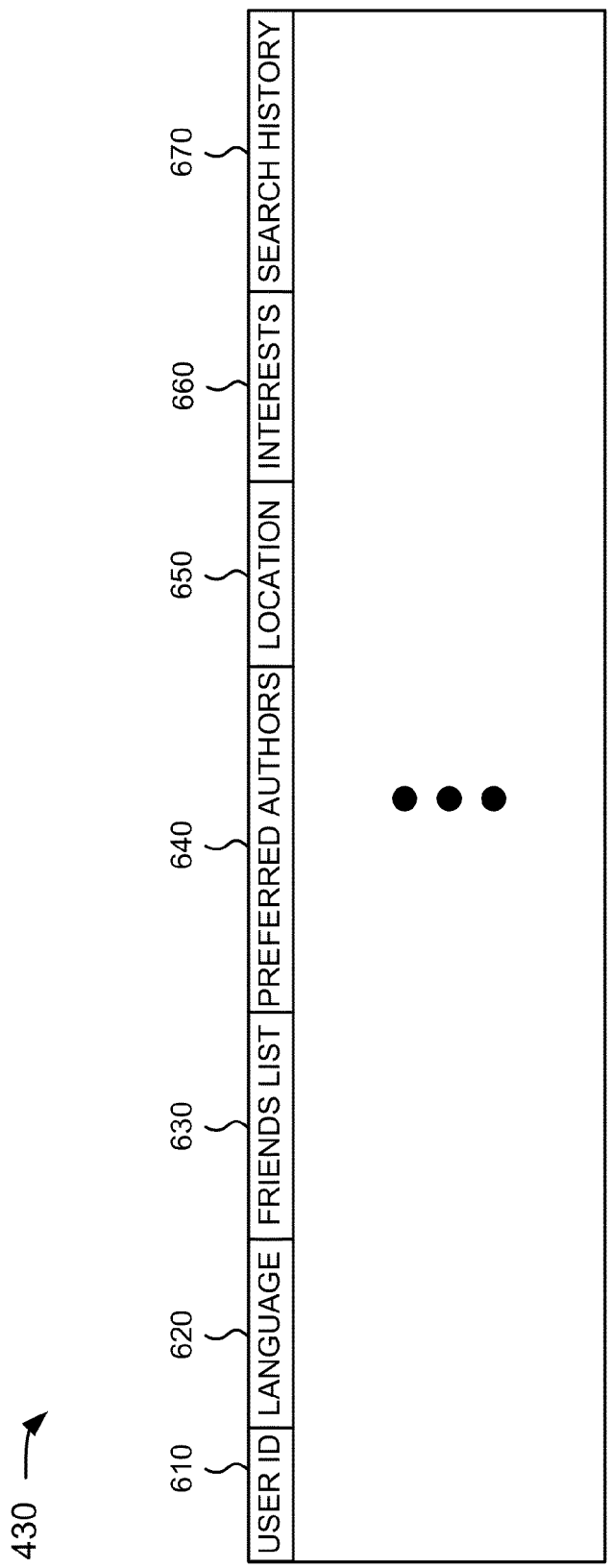
FIG. 6 is a diagram of exemplary fields that may be provided within the user profile database of FIG. 4.

FIG. 6 is a diagram of exemplary fields that may be provided within user profile database 430. As shown in FIG. 6, a record in user profile database 430 may include user identification field 610, language field 620, friends list field 630, preferred authors field 640, location field 650, interests field 660, and search history field 670. In other implementations, records in comments database 150 may include more or fewer fields.

User identification field 610 may include information that identifies a particular user. User identification field 610 may include a name of a user, a user login name, or a specific identification string that identifies the particular user. Additionally, user identification field 610 may store an image of the user, a graphic associated with the user (such as an avatar), or other information associated with the user.

Languages which have been identified as acceptable to a user may be included in language field 620. In one implementation, languages in language field 620 may be explicitly provided by the user. In another implementation, languages in language field 620 may be selected based on the user's activity. For example, if the user regularly accesses documents in Chinese, Chinese may be added to language field 620. Computing when to consider that a user regularly accesses documents in a particular language may be based on a threshold, such as a particular number of documents in a particular language over a particular period of time. Languages in language field 620 may also be based on the user's location. For example, users in the United States may want to see comments in English, while users in Germany may want to see comments in German.

Friends list field 630 may include a list of users that the user considers friends. In one implementation, friends list field 630 may include user identification information of the friends, such as user identification information from user identification field 610 of the user profile of the friend. In another implementation, friends list 630 may include a pointer to the user profile of the friend. If a particular friend in the friends list does not have a user profile, other identification information may be included.

A list of users included in friends list field 630 may be provided, at least in part, explicitly by the user. For example, friends of the user may be identified by the user when creating the user profile by providing to the user an option to enter a list of friends. Alternatively or additionally, other methods may be executed to identify friends of the user. For example, friends of the user may also be identified based on other user accounts associated with the user. For example, friends of the user may be identified based on a contacts list in an email account associated with the user. Friends of the user may also be identified by crawling social network websites. For example, the user may have an account on Facebook, Myspace, or any other web site where a user may indicate friends, and friends of the user may be identified based on the account. Friends of the user may be stored in friends list field 630 of the user's profile. A popular user may have hundreds of friends. In one implementation, friends list field 630 may only store a particular number of friends. In another implementation, all the identified friends may be stored in friends list field 630.

Friends identified and stored in friends list field 630 may be ranked in various ways. In one implementation, user profile component 440 may score friends automatically based on predetermined rules and rank the friends based on the scores. In another implementation, user profile component 440 may present, to the user, an option to specify what criteria to use to rank friends, and/or an option to let the user rank the friends manually. Friends stored in friends list field 630, may be ranked based on information obtained about the user's interaction with the friends. For example, a user may send messages to, or comment on documents associated with, a first friend more than a second friend. This may be an indication that the first friend is more important, to the user, than the second friend and, consequently, the first friend may be ranked higher than the second friend in friends list field 630. When using friends list field 630 to score comments based on subjective parameters associated with the user, a comment by the first friend may be scored higher than a comment by the second friend.

Preferred authors field 640 may include a list of authors that have been identified as authors for whose content the user has expressed a preference. Different users may have preferences for different authors. The preferred authors may differ from friends in that friends might be other users that the user personally knows or with whom the user communicates, while preferred authors might be other users that the user does not know, but whose content the user has liked in the past. In one implementation, preferred authors field 640 may include user identification information of the authors, such as user identification information from user identification field 610 of the user profile of the authors. In another implementation, preferred authors field 640 may include a pointer to the user profile of the author. If a particular author does not have a user profile, other identification information may be included.

In one implementation, a list of preferred authors 640 may be provided, at least in part, explicitly by the user. In another implementation, or in addition to a list provided by the user, other methods may be executed to identify preferred authors of the user, such as by analyzing documents that the user accesses, or by analyzing comments that the user has rated. In yet another implementation, preferred authors field 640 may include information regarding authors that the user does not like and from whom the user would not like to see comments. For example, the user might find a particular author offensive or boring. Authors that the user does not like may be stored in preferred authors field 640 along with an indication not to include comments from these authors when presenting comments to the user.

Preferred authors of the user may be identified based on documents accessed by the user. A comments toolbar installed in a browser may, with the user's permission, gather information about documents that the user has accessed and send the information to user profile component 440. A user may access documents written or created by one or more particular authors. As an example, a user may regularly visit a blog written by a particular author. As another example, a user may access online books written by a particular author. As yet another example, a user may download images created by a particular author.

Authors identified based on accessed documents may be stored in preferred authors field 640 of the user's profile by user profile component 440. Whether to store an identified author based on accessed documents in preferred authors field may depend on a combination of at least one of the following factors: 1) how many times the user has accessed documents associated with the identified author; 2) how many different documents associated with the author the user has accessed; 3) the period of time over which the user has accessed the documents accessed; and/or 4) how much time has passed since the last time the user has accessed a document associated with the author. Each of the four factors may have an associated threshold. A combination of the associated thresholds may be used to determine whether to store an identified author in preferred authors field 640.

Preferred authors may be identified based on comments that a user has rated. A comment that is presented to users may be provided along with an option to rate the comment. A comments toolbar installed in a browser may, with the user's permission, gather information about comments that the user has rated and send the information to user profile component 440. Consequently, information regarding authors based on rated comments may be stored in preferred authors field 640 of a user's profile by user profile component 440. Whether to store information about an author based on rated comments may, for example, be based on a number of comments created by that author that the user has rated. For example, if a user highly rates comments created by a particular author a threshold number of times, it may indicate that the user values the author's opinions. Consequently, information regarding a preference for the author may be stored in preferred authors field 640. As another example, if a user poorly rates comments by a particular author a threshold number of times, it may indicate that the user does not like the particular author. Consequently, information regarding a dislike for the author may be stored in preferred authors field 640, or another field, of the user's profile.

Authors identified as preferred authors may be scored in various ways. In one implementation, user profile component 440 may score authors automatically based on predetermined rules and rank the authors based on the scores. In another implementation, user profile component 440 may present to the user an option to specify what criteria to use to rank authors, and/or an option to let the user rank the authors manually.

The score, which is used to rank a particular author, may depend on the extent to which a user prefers the author. For example, a first author whose blog the user reads every day may be ranked higher than a second author whose blog the user read once a week. As another example, a first author whose comments the user has always rated highly may be ranked higher than a second author whose comments the user has rated highly only some of the time. Authors identified by rated comments may be ranked higher than authors identified based on accessed documents. Users may prefer to see comments by authors whose comments they have rated highly before seeing comments by authors whose contents they like to read.

Information regarding the identified authors, including the associated scores of the authors, may be stored in preferred authors field 640 of the user's profile. User profile component 440 may identify hundreds of authors. In one implementation, preferred authors field 640 may only store information about a predetermined number of authors. For example, only information about authors with the ten highest scores may be stored. In another implementation, information about all authors identified as preferred authors may be stored.

Location field 650 may include information about a geographic location of the user. A user may provide a geographic location when creating a user profile. For example, a user may provide a street address, a city, a state, a zip code, a country, or any combination thereof. Location field 650 may store the information as provided by the user, or the information may be converted to a code, such as a longitude and latitude code, or a triangular mesh grid code. In another implementation, geographic location of the user may be determined based on an IP address associated with a client 210 of the user. Location field 650 may also include the IP address information.

Interests field 660 may include information about the interests of the user. The information about the interests may be in the form of keywords. The information about the interests may also be in the form of category codes for a particular category classification scheme. The user may provide the information about the user's interests when creating the user profile. In another implementation, the information about the user's interests may be determined based on documents that the user has accessed. For example, documents that the user has accessed may be analyzed, with the user's permission, for topics by searching for noun phrases or noting any tags associated with the documents.

Search history field 670 may include information about recent search queries that the user has submitted. In a particular implementation, the user may be presented with the option of not recording the user's search queries. In one implementation, search history field 670 may include search queries entered by the user. In another implementation, search history field 670 may include keywords based on analyzing a series of search queries submitted by the user. For example, assume the user has entered the following search queries: "find cheap airline tickets," "luggage", and "hotel reviews." Based on the entered search queries, search history field 670 may store a "travel" keyword.

User profile database 430 may additionally store other information. For example, a user profile for a particular user may store a list of comments that the user has rated, along with a rating that the particular user has given to a particular comment. In one implementation, comments that the user has rated may be identified based on comment identifier field 505 of the comment. In another implementation, user profile database 430 may store pointers to records of comments stored in comments database 150 for comments that the user has rated, along with a rating that the user has given to each particular comment.

Exemplary Processes

Figure 7:
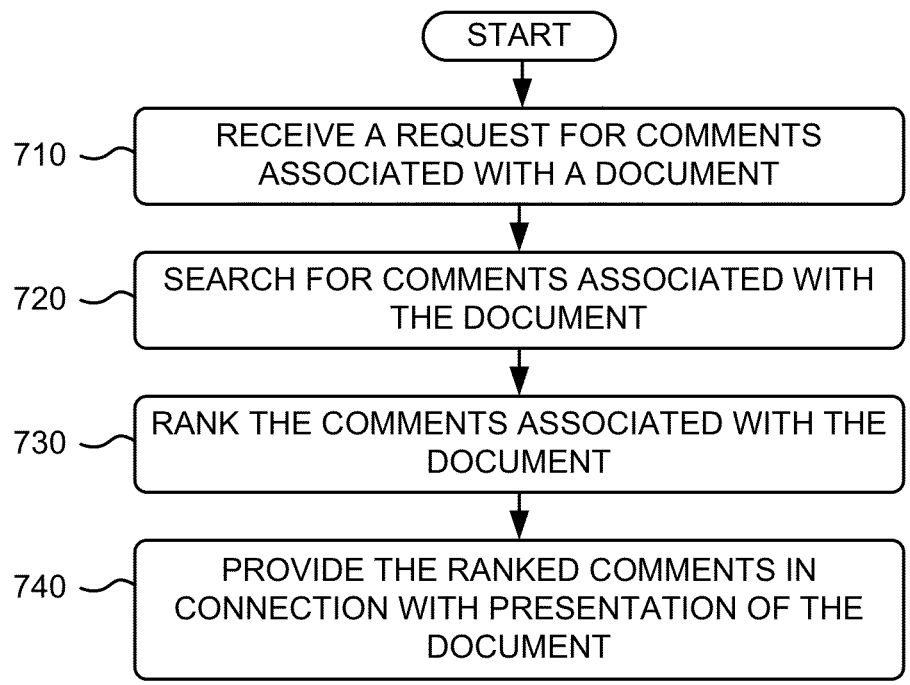
FIG. 7 is a flowchart of an exemplary process for providing comments in connection with a document.
Figure 8:
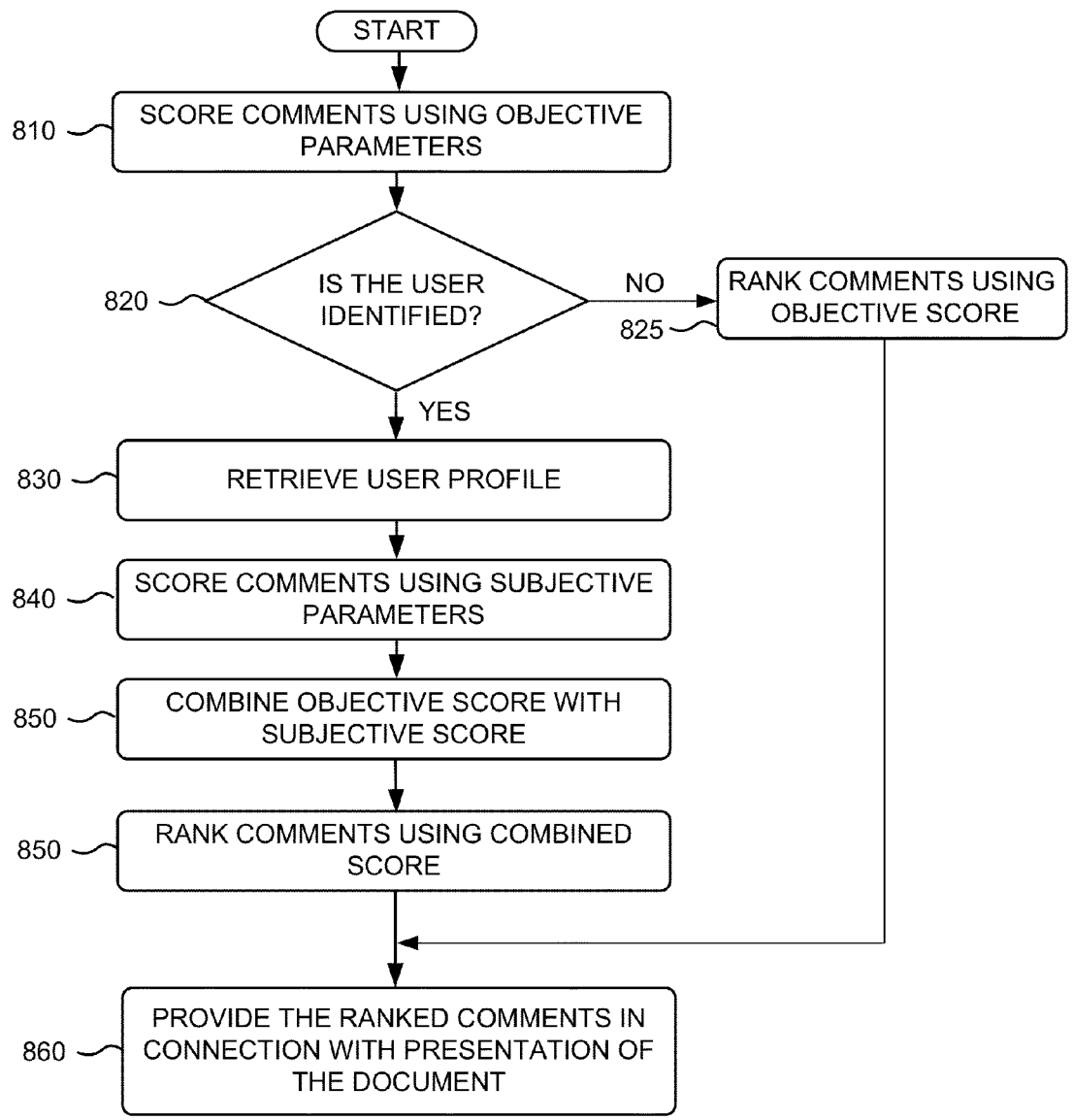
FIG. 8 is a flowchart of an exemplary process for ranking comments associated with a document.

FIGS. 7 and 8 depict flowcharts of exemplary processes described herein. In one implementation, the processes of FIGS. 7 and 8 may be performed by one or more components within server 220, client 210, or a combination of server 220 and client 210. In another implementation, the process may be performed by one or more components within another device or a group of devices separate from or including server 220 and/or client 210. One or more blocks of FIGS. 7 and 8 may be performed by one or more processors associated with comments server 140.

FIG. 7 is a flowchart of an exemplary process for providing ranked comments to a user in connection with presentation of a document. The process of FIG. 7 may begin with receiving a request for comments about a document (block 710). In one implementation, the request may be received in response to a specific user action. For example, the user may click on a button labeled "comments" on a toolbar installed in the browser. In another implementation, the request may be sent automatically in connection with a request for the document. For example, the user may click on a link to the document or enter an address in an address box of a browser.

In response to receiving a request for comments about a particular document, searching component 410 may perform a search for comments associated with the particular document (block 720). For example, searching component 410 may search comments database 150 for comments about the particular document. Comments that match the particular document may be identified. For example, comment records that have a URL in document identifier field 540 matching the URL of the particular document may be identified.

Ranking component 420 may rank the identified comments (block 730). The ranked comments may be provided in connection with presentation of the particular document (block 740). For example, the ranked comments may be provided for display in a same window with the document. Alternatively, the ranked comments could be presented in a new window, in a frame, or in some other manner.

FIG. 8 is a flowchart of an exemplary process for ranking comments. The process of FIG. 8 may begin with scoring comments based on objective parameters (block 810). For example, objective ranking component 422 may score the comments using objective parameters. Objective parameters may include parameters with values that are independent of a particular user.

Figure 9:
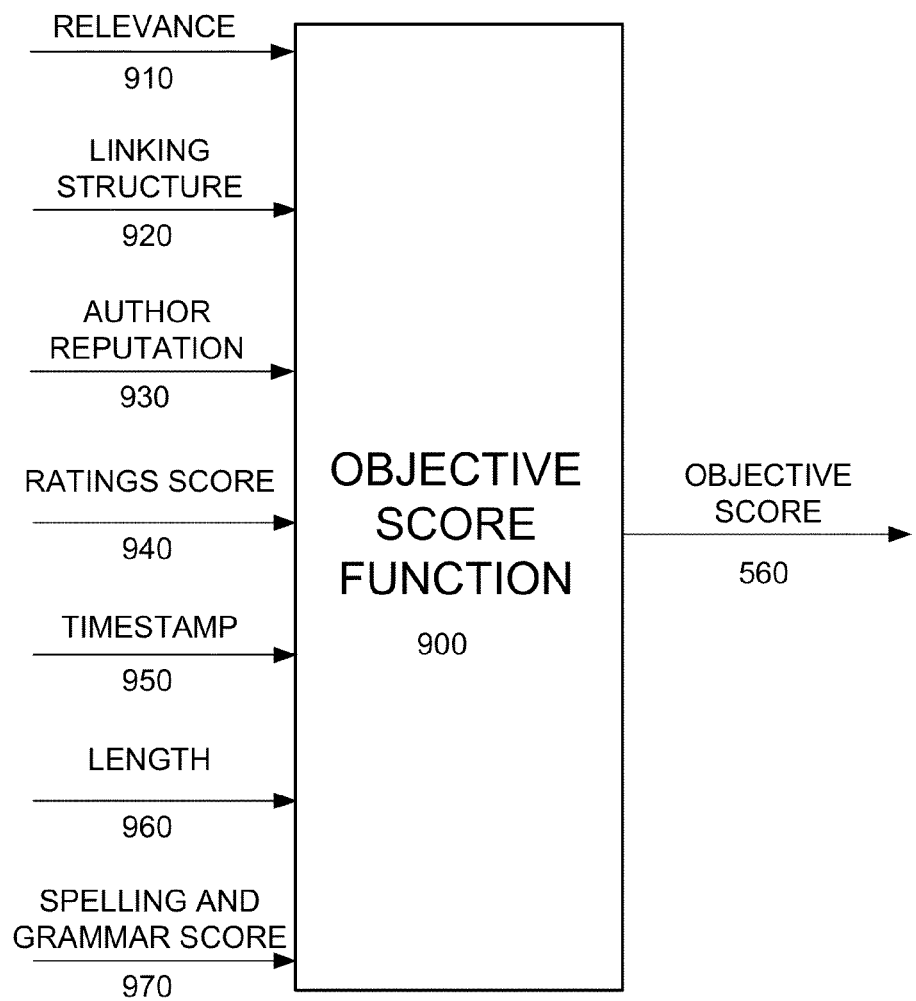
FIG. 9 is a diagram of an exemplary function for generating an objective score.

FIG. 9 is a diagram of an exemplary function for scoring a comment based on objective parameters. Objective parameters may include a measure of relevance 910 of a comment, a linking structure 920 of a comment, author reputation 930 of a comment, ratings score 940 for a comment, timestamp 950 of a comment, length 960 of a comment, and spelling and grammar score 970 of a comment. Objective ranking function 900 may take, as input, values for any number of the parameters indicated on FIG. 9. In particular implementations, any of the parameters may be omitted as an input to objective score function 900, and/or additional parameters not depicted may be added as inputs. Objective score function 900 may, for a particular comment, take, as input, values for the depicted parameters and compute objective score 560 for the particular comment.

An input parameter to objective score function 900 may include a measure of relevance 910 of a comment to the document. The relevance of a comment may indicate how closely terms in the content of the comment correspond to terms in the content of the document to which the comment corresponds. For example, a document may describe how to choose a reliable car, and may include the terms "reliable car." A comment which includes the terms "reliable car" may have a high measure of relevance to the document. A benefit of scoring comments based on relevance may include providing comments to a user that specifically relate to the content of the document with which the comment is associated.

An input parameter to objective score function 900 may include a linking structure 920 of a comment. Users may have an option to include hyperlinks in comments. These hyperlinks may link to other comments. Linking structure may refer to how many other comments or documents link to a particular comment. For example, a document may be a web page describing a product. A user may create (or modify) a comment that reviews the product, and other users may find the comment to be particularly detailed or insightful. Many other users, when creating (or modifying) comments about the product, may refer to that comment and include a link to the comment. As another example, many other users may disagree with a comment about the product and include a link to the comment for reference. A benefit of scoring comments based on linking structure may include providing an important comment to a user, where the comment is considered important because the comment was referenced by many other users.

An input parameter to objective score function 900 may include author reputation 930 of an author of a comment. Author reputation may refer to an author that has many visitors to a document that the author has created. For example, an author may have a blog that receives many hits. Author reputation may also refer to how the author's comments are rated. For example, many users may give a particular author's comments a favorable rating. Each author may have an author reputation score. A benefit of scoring comments based on author reputation may include providing a comment to a user that was written by a highly regarded author. In another implementation, an author's comments may consistently get low ratings from users, and the author may have a low author reputation score. In that case, scoring comments based on author reputation may include the benefit of omitting comments from poorly regarded authors when providing comments to a user.

An input parameter to objective score function 900 may include ratings score 940 for a comment. Ratings score 940 may correspond to a value stored in comment rating field 550. Ratings score 940 may refer to an average rating for the comment. In one implementation, users may rate a comment on a two point scale. A two point scale may include a positive rating and a negative rating. In another implementation, users may rate a comment on a multiple point scale, such as a five point scale. A five point scale may include five points, with one point indicating a very low rating and five points indicating a very high rating. A benefit of scoring comments based on user ratings may include providing a comment to a user that has been highly rated by many users. Such a comment may include valuable content. Another benefit of scoring comments based on user ratings may include omitting a comment that was rated low by many users. Such a comment may not include valuable content, or may include offensive content. Ratings score 940 may include a weight based on how many users the user ratings score is based. For example, in the five point scale implementation, a rating with an average of four points, based on five user ratings, may be scored lower than a rating with an average of three points, based on twenty user ratings.

An input parameter to objective score function 900 may include timestamp 950. A comment may include a timestamp that records a time and/or a date at which the comment was created (or modified). More recent comments may be rated higher than less recent comments. By scoring comments based on a timestamp, comments that are more recent (e.g. fresher) may be presented over less recent (e.g. stale) comments.

An input parameter to objective score function 900 may include length 960. Comments may be of various lengths. In one implementation, a comment of greater length may be scored higher than a comment of lesser length. In another implementation, comments with a length greater than a particular threshold may receive a boost in score. A benefit of scoring comments based on length may include providing to a user a long comment that includes more content. For example, a comment that explains in detail an author's opinion of a document may be more valuable than a comment that only includes the content "I like this document." In yet another implementation, comments that are too long may be penalized. Users may not want to see comments that are excessively long. Therefore, comments that are longer than a particular length may receive a lower score. In yet another implementation, comments that have a length that falls within a particular range may receive a boost in score. For example, comments that have a word (or character) count greater than a first threshold, but less than a second threshold, may be ranked higher than comments that are either shorter or longer than the particular range.

An input parameter to objective ranking function 1000 may include spelling and grammar score 1070 of a comment. For example, comments with bad spelling and grammar may be assigned a low spelling and grammar score and comments with few spelling and grammar mistakes may be assigned a high spelling and grammar score. Comments with few spelling and grammar mistakes may include more reliable content. A benefit of scoring comments based on spelling and grammar may include providing to a user comments that are easier to read and include more reliable content. Spelling and grammar score may additionally be based on proper capitalization. For example, a comment written in all capitals may have a lowered spelling and grammar score.

Other parameters may be included as input to objective score function 900. For example, an indication that a comment includes profanity may be used to demote the objective ranking score of the comment. In one implementation, inputs to objective score function 900 may include weights and objective score 560 may be based on a weighted average. For example, each input value may be multiplied by the associated weight, and the weighted values may be added and divided by the number of inputs. The objective parameters used as inputs for objective score function 900 may have different scales, and therefore the values may be normalized before the values are combined. In another implementation, particular inputs may provide a boost to the objective ranking score. The inputs to objective score function 900 may be combined in any number of ways to compute objective score 560.

In one implementation, objective score 560 for a comment may be computed when the comment is created (or modified), and may be updated periodically. For example, if a user rates the comment favorably, the objective score 560 of the comment may be increased accordingly. As another example, if a particular time period elapses since the creation (or modification) of the comment, indicating that the comment is not a recent comment, the objective score 560 may be lowered. In another implementation, objective score 560 may be computed at a time when the comment is identified as matching a request for comments from a user.

Returning to FIG. 8, ranking component 420 may determine whether the user can be identified (block 820). For example, a user may be identified with an existing user profile through a login process. As another example, a user may create a new user profile and may be identified through the user profile creation process. As yet another example, a user may be identified based on an IP address, a cookie file, or by receiving information from a server associated with a third party. If the user is not identified (block 820—no), ranking component 420 may rank the comments using objective score 560 (block 825). In other words, if the user is not identified, the comments may be ranked based on objective parameters and no subjective parameters.

If the user can be identified (block 820—yes), ranking component may retrieve a user profile associated with the user (block 830). For example, comments server 140 may retrieve the user profile from user profile database 430. Subjective ranking component 424 may score the comments using subjective parameters (block 860). Subjective parameters may include parameters with values that depend on a particular user. The subjective parameters may be based on information from the retrieved user profile.

Figure 10:
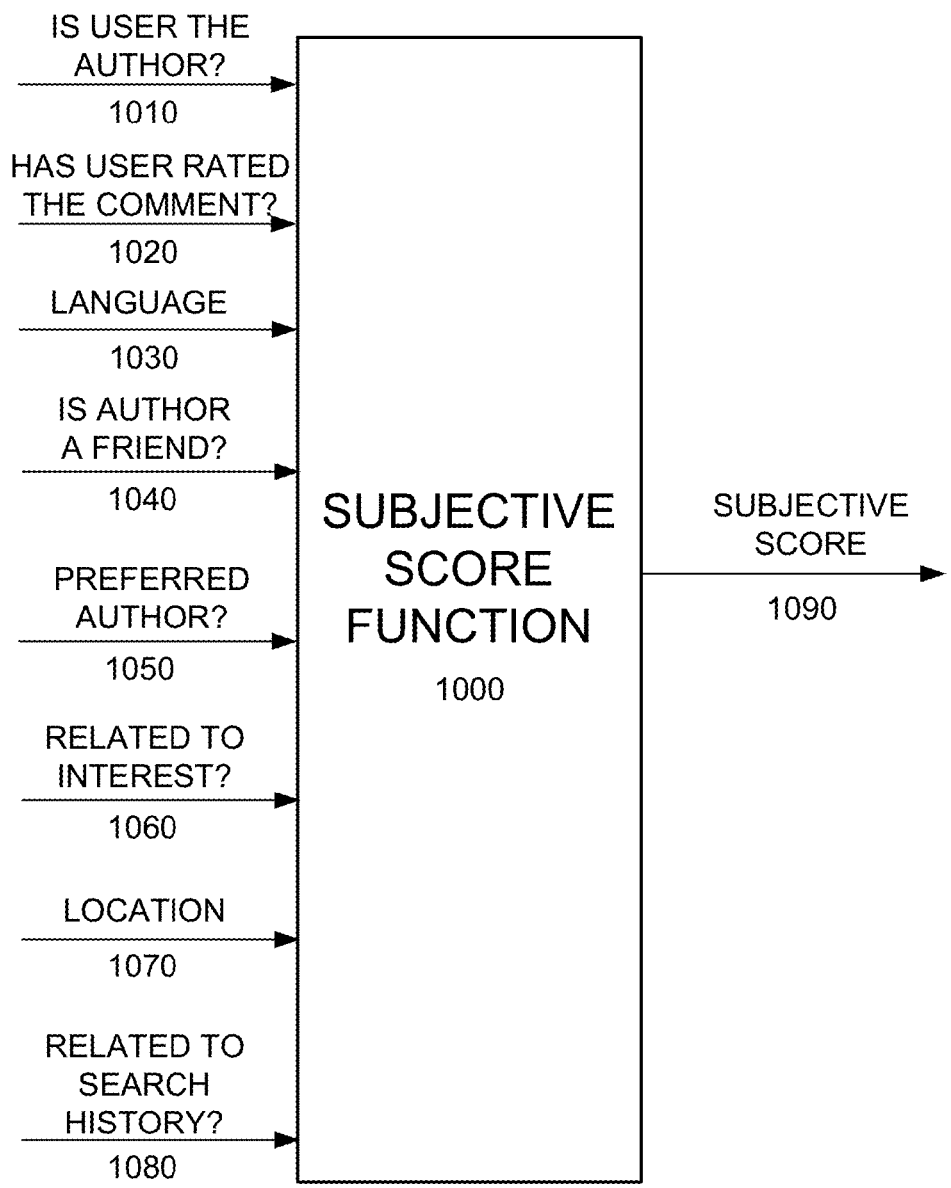
FIG. 10 is a diagram of an exemplary function for generating a subjective score.

FIG. 10 is a diagram of an exemplary function for scoring a comment based on subjective parameters associated with a particular user. Subjective score function 1000 may take, as input, values for any number of the parameters indicated on FIG. 10. In particular implementations, any of the parameters may be omitted as an input to subjective ranking function 1000, and additional parameters not depicted may be added as inputs. Subjective score function 1000 may, for a particular comment, take, as input, values for the depicted parameters and compute subjective ranking score 1090 for the particular comment. Inputs to subjective score function 1000 may include an indication 1010 that the user is the author of the comment, an indication 1020 that the user has rated the comment, a language 1030 of the comment, an indication 1040 that the author of the comment is a friend of the user, an indication 1050 that the author of the comment is a preferred author of the user, an indication 1060 that content of the comment is related to an interest of the user, a location 1070 associated with the comment, and an indication 1080 that content of a comment is related to search history of the user.

An input parameter to subjective score function 1000 may include an indication 1010 that the user is the author of the comment. Users may prefer to see their own comments.

When computing a subjective score of a comment for a particular user, author field 510 in comments database 150 that is associated with the comment may be matched with user identification field 610 of the particular user's profile. In one implementation, any comments made by a user for a particular document may be ranked higher than comments made by other users for the particular document when presenting comments about the particular document to the user. A benefit of scoring comments based on whether the user is the author of the comment, when providing comments to the user, may include letting a user see comments that the user made about the document.

An input parameter to subjective score function 1000 may include an indication 1020 that the user has rated the comment. A user may prefer to see comments based on ratings that the user has previously given to the comments. For example, if the user rated the comment highly, the comment may receive a higher subjective score and therefore a boost in rank. If the user gave the comment a low rating, the comment may receive a lower subjective score and, consequently, the comment's rank may be demoted. User profiles may include information about which comments the user has rated. For example, user profiles stored in user profile database 430 may store a list of comments that the user has rated, along with a rating that the user has given to each particular comment. When computing a subjective score of a comment for a particular user, comment identifier 505 in comments database 150 that is associated with the comment may be matched with a list of comments that the user has rated stored in user profile database 430. A benefit of scoring comments based on whether a user has rated the comment, when providing comments to the user, may include providing to the user comments that the user has liked in the past and omitting comments that the user has not liked in the past.

An input parameter to subjective score function 1000 may include language 1030 of the comment. In one implementation, a language of a comment may be identified by analyzing the content of the comment. In another implementation, comments database 150 may store an indication of a language in which a particular comment is written. When computing a subjective score of a comment for a particular user, the language that is associated with the comment may be matched with an entry stored in language field 620 of the particular user's profile. For example, comments in a language that is not included in language field 620 of the user's profile may be given a lower subjective score and therefore demoted in rank or altogether omitted when providing comments to the user. A benefit of scoring comments based on the language of the comment, when providing comments to the user, may include omitting comments that the user may not be able to read.

An input parameter to subjective score function 1000 may include an indication 1040 that the author of a comment is a friend of the user. A friend of the user may be another user that the user personally knows or communicates with. A list of friends of the user may be stored in friends list field 630 of the user's profile. When computing a subjective score of a comment for a particular user, author field 510 in comments database 150 that is associated with the comment may be matched with an entry in friends list field 630 of the particular user's profile. If the author of a comment is a friend of the particular user, the comment may receive a boost in rank. Friends stored in friends list field 630 may be ranked based on information obtained about the user's interaction with the friends. For example, a user may send messages to, or comment on documents associated with, a first friend more than a second friend. This may be an indication that the first friend is more important than the second friend and, consequently, the first friend may be ranked higher than the second friend in friends list field 630. When using friends list field 630 to score comments based on subjective parameters associated with the user, a comment by the first friend may be scored higher than a comment by the second friend. A benefit of scoring comments based on whether the author of a comment is a friend of the user, when providing comments to the user, may include providing comments to the user authored by people the user personally knows and whose opinion the user may value higher than the opinion of other people.

An input parameter to subjective score function 1000 may include an indication 1050 that the author of a comment is a preferred author of the user. A user may have preferred authors that have been identified as authors whose content the user likes to read. A list of a user's preferred authors may be stored in preferred authors list field 640 of the user's profile. When computing a subjective score of a comment for a particular user, author field 510 in comments database 150 that is associated with the comment may be matched with an entry in preferred authors list field 640 of the particular user's profile. If the author of a comment is a preferred author of the user, the comment may receive a boost in score. The boost in score may be in relation to the score of the author in the list of preferred authors included in preferred author list field 640. A benefit of scoring comments based on a user's preferred authors, when providing comments to the user, may include providing comments to the user created by people whose content the user has liked in the past.

Other methods for scoring a comment based on author may be used. For example, an author of a comment may share similar interests with the user, and users may want to see comments made by authors with similar interests. Such an author may not be stored in preferred authors field 640 of the user's profile. An author's user profile may include interests field 660 with entries that match entries in interests field 660 of the user's profile. A comment made by an author with similar interests to the user may receive a boost in the subjective score when presenting comments to the user.

An input parameter to subjective scoring function 1000 may include an indication 1060 that the content of a comment is related to an interest of the user. A comment may include a tag that indicates a topic associated with the comment. Topics that have been identified as topics in which the user has expressed an interest may be stored in interests field 660 of the user's profile. The tag of the comment may be matched with an entry in interests field 660 of the user's profile. A topic associated with a comment may also be determined by searching the content of the comment for noun phrases. If a topic associated with a comment matches an entry in interests field 660 of the user's profile, the comment may receive a boost in rank. In one implementation, entries in interests field 660 may be ranked and the boost in rank may be based on a rank of the particular interest, as recorded in interests field 660, which matches a topic associated with the comment. A benefit of scoring comments based on a user's interests, when providing comments to the user, may include providing comments whose content is of interest to the user.

An input parameter to subjective score function 1000 may include a location 1070 associated with a comment. A comment may have a location associated with it. In one implementation, a location may be associated with a comment based on a location associated with the author of a comment. Alternatively or additionally, a location may be associated with a comment based on content of the comment. For example, a comment may include terms with geographic relevance, such as the name of a geographic area. Moreover, a location may be associated with the document with which the comment is associated. For example, a document may be a document about a local business (even though the content of the document may not include geographically relevant terms), and the comment may likely be related to the local business. A user may have a location associated with the user. The location associated with the user may be stored in location field 650 of the user's profile. A user may want to see comments that are about the user's location. When computing a subjective score of a comment for a particular user, the location that is associated with the comment, and/or the location that is associated with the document with which the comment is associated, may be matched with an entry in location field 650 of the particular user's profile. A benefit of scoring comments based on location, when providing comments to the user, may include providing comments that are relevant to the user's location.

An input parameter to subjective score function 1000 may include an indication 1080 that content of a comment is related to a search history of a user. A comment may include a tag that indicates a topic associated with the comment. The tag of the comment may be matched with an entry in search history field 670 of the user's profile. A topic associated with a comment may also be determined by searching the content of the comment for noun phrases. If a topic associated with a comment matches an entry in search history field 670 of the user's profile, the comment may receive a boost in rank. In one implementation, entries in search history field 670 may be ranked (e.g. based on how recently a particular search query was submitted) and the boost in subjective score for a comment may be based on a rank of the entry in search history field 670 that matches a topic associated with the comment. A benefit of scoring comments based on a user's search history, when providing comments to the user, may include providing comments that include content about which the user has expressed an interest.

Other parameters may be included as input to subjective score function 1000. For example, a user may provide one or more keywords, when requesting comments about a document. A comments toolbar installed in the browser of the client device may include an option to enter keywords when a user requests comments for a document. For example, a user may be looking at a document about a particular model of digital camera. The user may request comments about the document and enter the keyword "night," because the user may be interested in night photography. Comments that include the keyword "night" may include opinions by other users about how the particular model of digital camera performs at night and may be ranked higher than other comments when providing the comments to the user.

In one implementation, inputs to subjective score function 1000 may include weights and subjective score 1090 may be based on a weighted average. For example, each input value may be multiplied by the associated weight, and the weighted values may be added and divided by the number of inputs. The subjective parameters used as inputs for subjective score function 1000 may have different scales, and therefore the values may be normalized before the values are combined. In another implementation, particular inputs may provide a boost to the subjective ranking score. The inputs to subjective ranking function 1000 may be combined in any number of ways to compute subjective ranking score 1090.

Returning to FIG. 8, the objective score and the subjective score for a comment may be combined into a combined score (block 850). For example, ranking component 420 may combine the objective score and the subjective score and generate a combined score.

Figure 11:
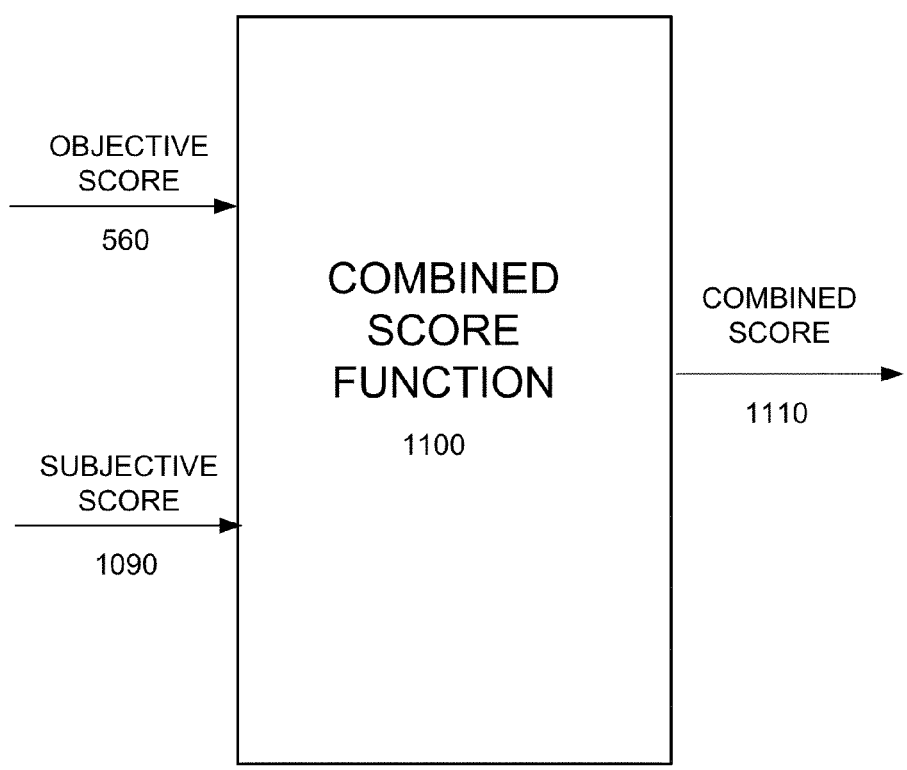
FIG. 11 is a diagram of an exemplary function for generating a combined score.

FIG. 11 is a diagram of an exemplary combined ranking function 1100 for combining objective ranking score 560 of a comment and subjective ranking score 1090 of the comment to generate combined score 1110 of the comment. In one implementation, combined score 1110 may be based on a weighted average. For example, objective score 980 and subjective score 1090 may each be multiplied by an associated weight, and the weighted values may be added and divided by two. Objective score 980 and subjective score 1090 may be combined in other ways to compute combined score 1110 for a comment.

Returning to FIG. 8, the ranked comments may be provided to the user in connection with presentation of the document for which the user has requested comments (block 860). The ranked comments that are provided to the user may be based on only the objective ranking parameters or may be based on a combination of the objective ranking parameters and the subjective ranking parameters. The ranked comments are provided in connection with presentation of the selected document. In one implementation, the ranked comments may be provided for display in a same browser window as the selected document. In another implementation, the ranked comments may be provided in a new window, a frame, or in some other manner.

In one implementation, the number of ranked comments that are presented to the user may depend on a particular threshold. The particular threshold may be selected by the user. For example, a user may select that maximum of ten comments be provided. In another implementation, the number of ranked comments may depend on a threshold combined score. For example, only comments with a combined score above a particular threshold value may be provided. In yet another implementation, all comments that were identified by searching component 410 may be provided to the user.

Figure 12:
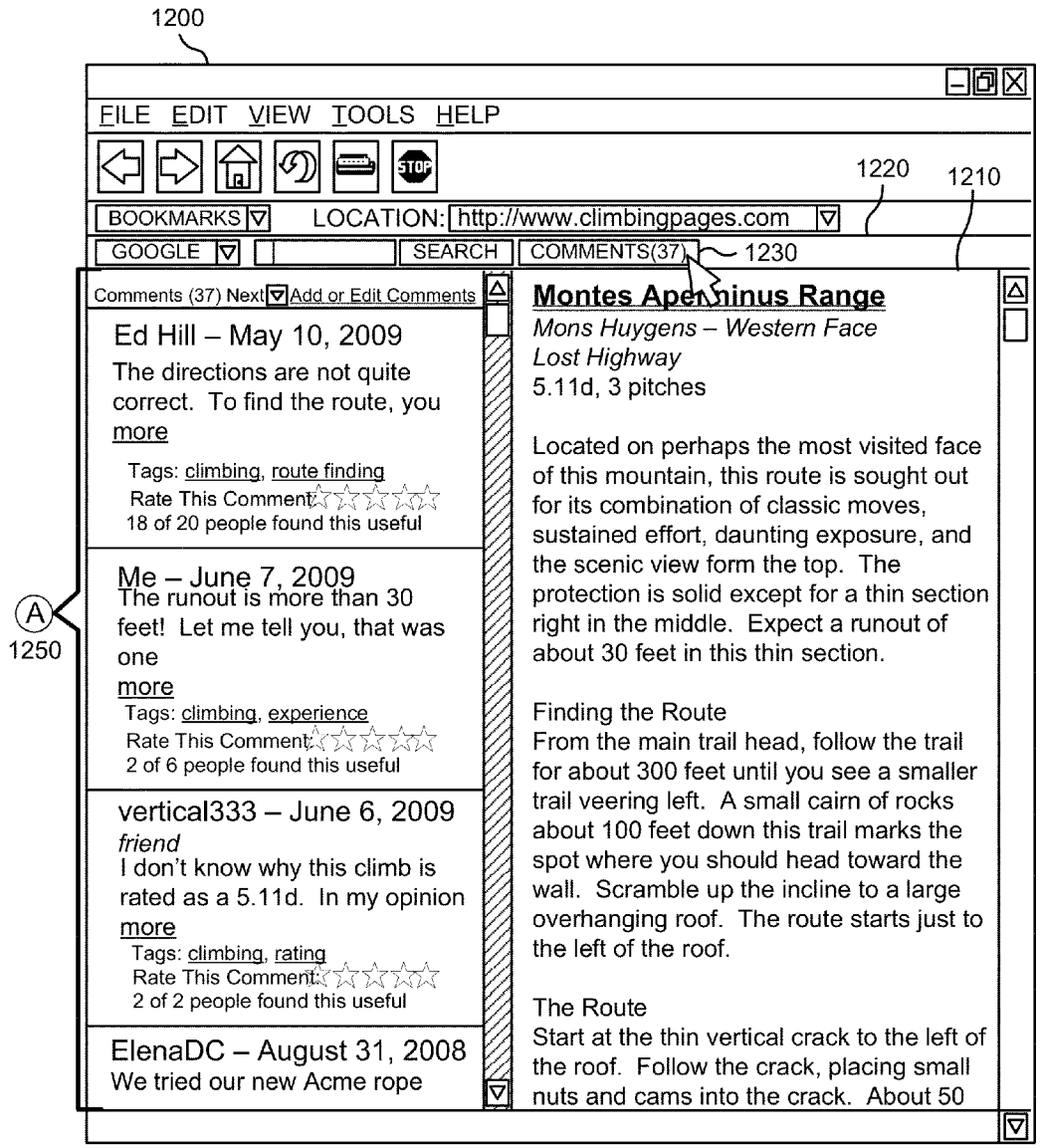
FIG. 12 is a diagram of exemplary information that may be presented within a browser.

FIG. 12 is a diagram of exemplary information that may be presented within a browser. A user may be provided with browser window 1200. Browser window 1200 may include document window 1210, toolbar 1220, and comments window 1250.

Browser window 1200 may include a document window 1210. Document window 1210 may display the contents of a document that the user has accessed. Browser window 1200 may include a toolbar 1220, such as a Google toolbar. Toolbar 1220 may include comments button 1230 for requesting comments about the displayed document. Button 1230 may include an indication of how many comments are available for the displayed document. When a user clicks on comments button 1230, comments associated with the document displayed in document window 1210 may be displayed in comments window 1250. Button 1230 may be configured to make comments window 1250 alternately appear and disappear with each click.

Figure 13:
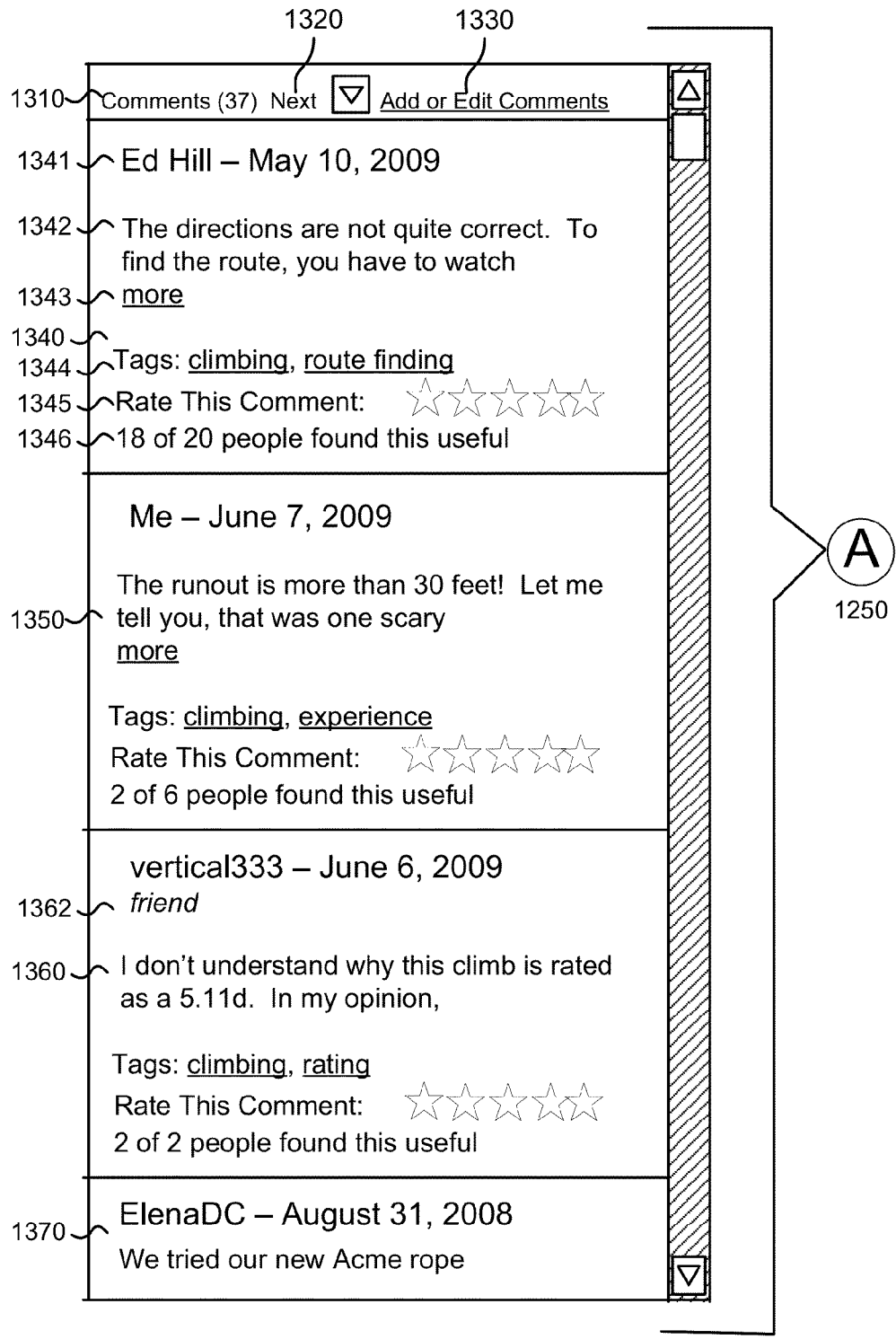
FIG. 13 is a diagram of a close-up view of a portion of the diagram of FIG. 12.

FIG. 13 is a diagram of a close-up view of comments window 1250. Comments window 1250 may include number of comments indication 1310, "next" button 1320, "add comment" button 1330, and one or more comments 1340, 1350, 1360, and 1370. In the example of FIG. 13, four comments are displayed. Number of comments indication 1310 may display how many comments are available for the document. "Next" button 1320 may provide a function for scrolling down to the next page of comments when a user clicks on "next" button 1320. "Add or edit comments" button 1330 may allow a user to add a comment to the document or edit an existing comment. For example, when a user clicks on "add or edit comments" button 1330, a new window may appear, allowing a user to enter text and other information to create a new comment or modify or edit an existing comment.

An individual comment may include author and date information 1341, comment content 1342, "more" button 1343, topic tags 1344, rating option 1345, and rating indication 1346. A comment may also include a friend indication 1362. Author and date information 1341 may display information about the author of the comment and the date and/or time on which the comment was created (or modified). The author may indicate a name of the author who created the comment. Comment content 1342 may include text, images, audio clips, hyperlinks, or other type of content that the author added to the comment. Only a portion of comment content 1342 may be visible in comments window 1250 so that other comments may be displayed at the same time. An individual comment may include "more" button 1343. When a user clicks on "more" button 1343, the window of the individual comment may expand downward and display the full contents of the individual comments.

An individual comment may include tags 1344 that indicate topics associated with the comment. Tags 1344 may be clickable. When a user clicks on a tag, comments that are displayed in comments window 1250 may be changed to comments that include the tag that was clicked. In the example of FIG. 13, if a user clicks on the "route finding" tag of comment 1340, comments that are displayed below comment 1340 may be changed to comments that include a "route finding" tag. This may allow a user to see comments associated with a particular topic. An individual comment may include rating option 1345 to provide a rating for the comment. In this example, the rating is a five scale rating. By clicking on a particular star, the user may indicate what rating the user is giving for the comment. Rating indication 1346 may indicate how many users found the comment useful. In this example, a user may be considered to have found a comment useful if the user gave the comment a favorable rating (e.g., 3 or more stars).

Comments presented in comment window 1250 may be presented in order of ranking based on combined score 1110 of each comment. Comment 1360 may be ranked higher than comment 1370, comment 1350 may be ranked higher than comment 1360, and comment 1340 may be ranked higher than comment 1350. Therefore, the highest ranked comment may be displayed on top in the most prominent position. In this example, document in document window 1210 of FIG. 12 is a document about a climbing route. Four comments are displayed in comments window 1250. Comment 1340 is displayed first. Comment 1340 may have the highest final ranking, because many users have ranked the comment highly. Comment 1350 may have the second highest rank, because the comment was created (or modified) by the particular user that is accessing the document. Comment 1360 may be ranked third, because the comment was made by a friend of the user. If a comment is made by a friend of the user, friend indication 1362 may be provided under the name of the author of the comment. Comment 1360 may be ranked fourth, because the comment includes the term "rope," and the user has recently entered a search query that included the term "rope."

The size of the individual comments that are displayed in comments window 1250 may be adjustable by dragging, with a pointing device such as a mouse or a stylus, a line that separates two comments.

Conclusion

Implementations, described herein, may provide ranked comments to a particular user in connection with presentation of a document. The comments may be ranked based on objective parameters, independent of the particular user, where the objective parameters may be used to determine a quality of the comment. The comments may additionally be ranked based on subjective parameters, which depend on the particular user, where the subjective parameters may be used to determine a measure of relevance of a comment to the particular user.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7, 8, and 9, the order of the blocks may be modified in other implementations. Further, non-dependent blocks may be performed in parallel.

Also, certain portions of the implementations have been described as "logic" or a "component" that performs one or more functions. The terms "logic" or "component" may include hardware, such as a processor, an ASIC, or a FPGA, or a combination of hardware and software (e.g., software running on a general purpose processor).

Further, it has been described that ranking scores are generated for comments and authors. The scoring scheme has been described where higher scores are better than lower scores. This need not be the case. In another implementation, the scoring scheme may be switched to one in which lower scores are better than higher scores.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by one or more server devices, the method comprising:
   receiving, using one or more processors associated with the one or more server devices, a request, from a user, for one or more comments associated with a particular document;
   determining, using one or more processors associated with the one or more server devices, whether a user profile is associated with the user;
   determining, using one or more processors associated with the one or more server devices and when the user profile is associated with the user, a subjective score for the one or more comments and an objective score for the one or more comments, the subjective score being based on the user profile;
   generating, using one or more processors associated with the one or more server devices and when the user profile is associated with the user, a combined score for the one or more comments by combining the objective score and the subjective score;
   ranking, using one or more processors associated with the one or more server devices and when the user profile is associated with the user, the one or more comments based on the combined score;
   ranking, using one or more processors associated with the one or more server devices and when the user profile is not associated with the user, the one or more comments based on the objective score; and
   providing for presentation, using one or more processors associated with the one or more server devices, the one or more comments ranked based on one of the combined score or the objective score.

2. The method of claim, where, when determining the objective score, the method further comprises:
   determining the objective score based on at least one of:
      a measure of relevance of the one or more comments to the particular document,
      information regarding a respective author reputation of the one or more comments,
      information regarding a respective ratings score of the one or more comments,
      a respective timestamp of the one or more comments, or
      a respective length of the one or more comments.

3. The method of claim 1, further comprising:
   modifying the objective score based on one or more user ratings associated with the one or more comments.

4. The method of claim 1, further comprising:
   modifying the objective score based on a length of time beginning after a creation of the one or more comments.

5. The method of claim 1, where, when determining the subjective score, the method further comprises:
   determining the subjective score based on at least one of:
      information indicating that the user is an author of at least one of the one or more comments,
      information indicating that the user has rated at least one of the one or more comments,
      a respective language of the one or more comments,
      a respective location associated with the one or more comments,
      information indicating that a respective author of the one or more comments is a preferred author of the user,
      information indicating that the one or more comments are associated with an area of interest of the user, or
      information indicating that the one or more comments are related to a search history associated with the user.

6. The method of claim 1, where the request includes one or more search terms, and, when providing the one or more comments, the method further comprises:
   providing the one or more comments based on a relationship between the one or more search terms and the one or more comments.

7. The method of claim 1, where a quantity of the one or more comments that are provided for presentation is based on a threshold quantity associated with the user.

8. The method of claim 1, where a quantity of the one or more comments that are provided for presentation is based on the combined score.

9. One or more devices comprising:
   one or more processors; and
   one or more memories including a plurality of instructions that, when executed by the one or more processors, cause the one or more processors to:
      receive a request, from a user, for one or more comments associated with a particular document;
      determine whether a user profile is associated with the user;
      determine, when the user profile is associated with the user, a subjective score for the one or more comments and an objective score for the one or more comments, the subjective score being based on the user profile;
      generate, when the user profile is associated with the user, a combined score for the one or more comments by combining the objective score and the subjective score;
      rank, when the user profile is associated with the user, the one or more comments based on the combined score;
      rank, when the user profile is not associated with the user, the one or more comments based on the objective score; and
      provide, for presentation, the one or more comments ranked based on one of the combined score or the objective score.

10. The one or more devices of claim 9, where, when determining the objective score, the one or more processors are further to:
    determine the objective score based on at least one of:
       a measure of relevance of the one or more comments to the particular document,
       information regarding a respective author reputation of the one or more comments,
       information regarding a respective ratings score of the one or more comments,
       a respective timestamp of the one or more comments, or
       a respective length of the one or more comments.

11. The one or more devices of claim 9, where the one or more processors are further to:
    modify the objective score based on one or more user ratings associated with the one or more comments.

12. The one or more devices of claim 9, where the one or more processors are further to:
  modify the objective score based on a length of time beginning after a creation of the one or more comments.

13. The one or more devices of claim 9, where, when determining the subjective score, the one or more processors are further to:
  determine the subjective score based on at least one of:
    information indicating that the user is an author of at least one of the one or more comments,
    information indicating that the user has rated at least one of the one or more comments,
    a respective language of the one or more comments,
    a respective location associated with the one or more comments,
    information indicating that a respective author of the one or more comments is a preferred author of the user,
    information indicating that the one or more comments are associated with an area of interest of the user, or
    information indicating that the one or more comments are related to a search history associated with the user.

14. The one or more devices of claim 9, where the request includes one or more search terms, and, when providing the one or more comments, the one or more processors are further to:
  provide the one or more comments based on a relationship between the one or more search terms and the one or more comments.

15. The one or more devices of claim 9, where a quantity of the one or more comments that are provided for presentation is based on a threshold quantity associated with the user.

16. The one or more devices of claim 9, where a quantity of the one or more comments that are provided for presentation is based on the combined score.

17. A non-transitory computer-readable storage medium comprising:
  one or more instructions which, when executed by at least one processor, cause the at least one processor to:
    receive a request, from a user, for one or more comments associated with a particular document;
    determine whether a user profile is associated with the user;
    determine, when the user profile is associated with the user, a subjective score for the one or more comments and an objective score for the one or more comments, the subjective score being based on the user profile;
    generate, when the user profile is associated with the user, a combined score for the one or more comments by combining the objective score and the subjective score;
    rank, when the user profile is associated with the user, the one or more comments based on the combined score;
    rank, when the user profile is not associated with the user, the one or more comments based on the objective score; and
    provide, for presentation, the one or more comments ranked based on one of the combined score or the objective score.

18. The medium of claim 17, where the request includes one or more search terms, and the one or more instructions to provide the one or more comments include:
  one or more instructions to provide the one or more comments based on a relationship between the one or more search terms and the one or more comments.

19. The medium of claim 17, further comprising at least one of:
  one or more instructions to modify the objective score based on one or more user ratings associated with the one or more comments, or
  one or more instructions to modify the objective score based on a length of time beginning after a creation of the one or more comments.

20. The medium of claim 17, where a quantity of the one or more comments that are provided for presentation is based on at least one of:
  a threshold quantity associated with the user, or
  the combined score.

* * * * *